(12) United States Patent
Krishnan et al.

(10) Patent No.: US 12,365,314 B2
(45) Date of Patent: Jul. 22, 2025

(54) CLEANING ASSEMBLY FOR VEHICLE SENSORS

(71) Applicant: Ford Global Technologies, LLC, Dearborn, MI (US)

(72) Inventors: Venkatesh Krishnan, Canton, MI (US); Segundo Baldovino, Novi, MI (US); Fabio Ferreira, Hortolandia (BR); Tyler D. Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 18/068,552

(22) Filed: Dec. 20, 2022

(65) Prior Publication Data
US 2024/0198971 A1    Jun. 20, 2024

(51) Int. Cl.
*B60S 1/48* (2006.01)
*B60S 1/50* (2006.01)
*G01F 23/263* (2022.01)

(52) U.S. Cl.
CPC .............. *B60S 1/481* (2013.01); *B60S 1/50* (2013.01); *G01F 23/266* (2013.01)

(58) Field of Classification Search
None
See application file for complete search history.

(56) References Cited

U.S. PATENT DOCUMENTS

| | | | |
|---|---|---|---|
| 6,237,627 B1 | 5/2001 | Boule | |
| 11,247,644 B2 * | 2/2022 | Robertson, Jr. | ....... G01L 5/0052 |

FOREIGN PATENT DOCUMENTS

| | | | | |
|---|---|---|---|---|
| CA | 2586964 A1 | 10/2008 | | |
| DE | 4334703 A1 | 4/1995 | | |
| DE | 102022209829 A1 * | 3/2024 | ................ | B60S 1/50 |
| EP | 1941409 A2 | 7/2008 | | |
| IN | 325650 A1 | 5/2017 | | |
| JP | 04166461 A | 6/1992 | | |
| KR | 2000000106 U | 1/2000 | | |

OTHER PUBLICATIONS

DE 10 2022209829 translation (Year: 2024).*

* cited by examiner

*Primary Examiner* — Rita P Adhlakha
(74) *Attorney, Agent, or Firm* — Frank A. Mackenzie; Brooks Kushman P.C.

(57) ABSTRACT

A cleaning assembly includes a first reservoir, a second reservoir, a first pump positioned to pump fluid out of the first reservoir, a second pump positioned to pump fluid out of the second reservoir, a connecting hose fluidly connecting the first reservoir and the second reservoir, and a third pump positioned to control fluid flow through the connecting hose. The third pump is operable to pump fluid from the first reservoir to the second reservoir, and the third pump is operable to pump fluid from the second reservoir to the first reservoir.

20 Claims, 5 Drawing Sheets

CLEANING ASSEMBLY FOR VEHICLE SENSORS

BACKGROUND

Autonomous and semi-autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. When sensor lenses, covers, and the like become dirty, smudged, etc., sensor operation can be impaired or precluded.

DETAILED DESCRIPTION

Figure 1:
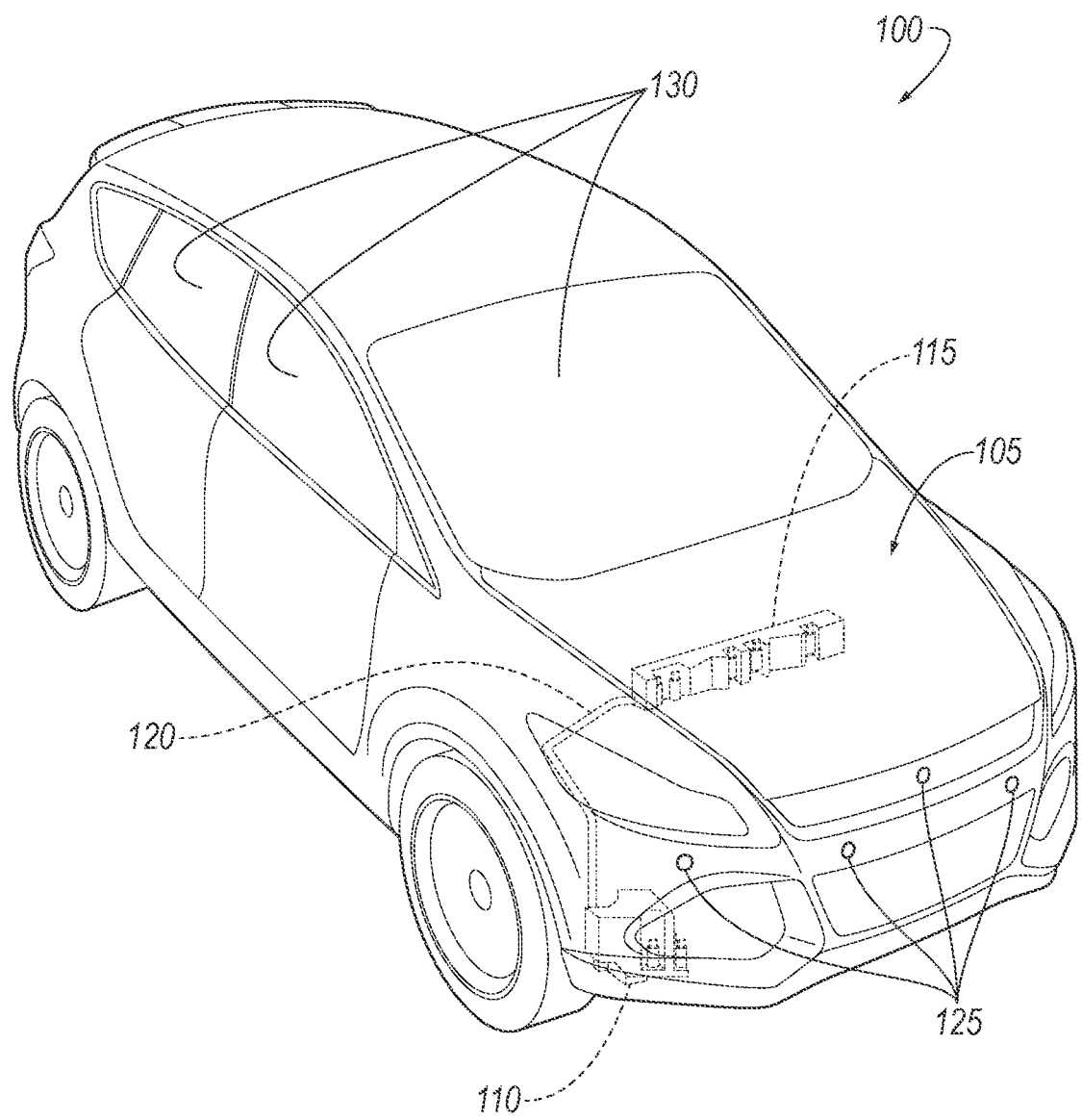
FIG. 1 is a perspective view of a vehicle with a cleaning assembly.

A cleaning assembly includes a first reservoir, a second reservoir, a first pump positioned to pump fluid out of the first reservoir, a second pump positioned to pump fluid out of the second reservoir, a connecting hose fluidly connecting the first reservoir and the second reservoir, and a third pump positioned to control fluid flow through the connecting hose. The third pump is operable to pump fluid from the first reservoir to the second reservoir, and the third pump is operable to pump fluid from the second reservoir to the first reservoir.

In an example, the first reservoir may include a filler neck. In a further example, the second reservoir may lack a filler neck. In a yet further example, a volume of the first reservoir may be greater than a volume of the second reservoir.

In another yet further example, the cleaning assembly may further include a variable fluid level sensor positioned to detect a fluid level of the first reservoir. In a still yet further example, the cleaning assembly may further include a fluid indicator sensor positioned to detect a presence of a fluid at a point in the second reservoir. In a further still yet further example, the second reservoir may lack sensors indicating fluid level other than the fluid indicator sensor.

In an example, the second reservoir may lack a filler neck.

In an example, the cleaning assembly may further include a controller communicatively coupled to the third pump, the controller may be programmed to actuate the third pump to pump fluid from the first reservoir to the second reservoir, and the controller may be programmed to actuate the third pump to pump fluid from the second reservoir to the first reservoir. In a further example, the controller may be programmed to receive a fluid level of the first reservoir, and actuate the third pump to pump fluid from the second reservoir to the first reservoir in response to the fluid level being below a threshold. In a yet further example, the threshold may be a low threshold, and the controller may be programmed to actuate the third pump to pump fluid from the first reservoir to the second reservoir in response to the fluid level being above a high threshold.

In another yet further example, the threshold may be a first threshold, the fluid level may be a first fluid level, and the controller may be programmed to receive a second fluid level of the second reservoir, and actuate the third pump to pump fluid from the first reservoir to the second reservoir in response to the second fluid level being below a second threshold. In a still yet further example, the controller may be programmed to actuate the third pump to pump fluid from the first reservoir to the second reservoir for a preset time in response to the second fluid level being below the second threshold.

In another still yet further example, the first reservoir may include a filler neck, and the second reservoir may lack a filler neck.

In another further example, the controller may be programmed to receive a fluid level of the first reservoir, and actuate the third pump to pump fluid from the first reservoir to the second reservoir in response to the fluid level being above a threshold.

In an example, the cleaning assembly may further include a nozzle positioned to receive fluid from the first pump, and the nozzle may be aimed at a sensor. In a further example, the nozzle may be a first nozzle, and the sensor may be a first sensor, the cleaning assembly may further include a second nozzle positioned to receive fluid from the second pump, and the second nozzle may be aimed at a second sensor.

In another further example, the cleaning assembly may further include a plurality of first pumps including the first pump and a plurality of nozzles including the nozzle, the first pumps may be positioned to pump fluid out of the first reservoir, each nozzle may be positioned to receive fluid from a respective one of the first pumps, and each nozzle may be aimed at a respective one of a plurality of sensors including the sensor. In a yet further example, the nozzles may be first nozzles, the sensors may be first sensors, the cleaning assembly may further include a plurality of second pumps and a plurality of second nozzles, the second pumps may be positioned to pump fluid out of the second reservoir, each second nozzle may be positioned to receive fluid from a respective one of the second pumps, and each second nozzle may be aimed at a respective one of a plurality of second sensors.

In an example, the third pump may have a lower head than the first pump.

With reference to the Figures, wherein like numerals indicate like parts throughout the several views, a cleaning assembly 105 of a vehicle 100 includes a first reservoir 110, a second reservoir 115, at least one first pump 205 positioned to pump fluid out of the first reservoir 110, at least one second pump 210 positioned to pump fluid out of the second reservoir 115, a connecting hose 120 fluidly connecting the first reservoir 110 and the second reservoir 115, and a third pump 215 positioned to control fluid flow through the connecting hose 120. The third pump 215 is operable to pump fluid from the first reservoir 110 to the second reservoir 115, and the third pump 215 is operable to pump fluid from the second reservoir 115 to the first reservoir 110.

The first pumps 205 and second pumps 210 may be used for selectively distributing fluid to different nozzles 220 for cleaning environmental sensors 125, as described below.

The environmental sensors 125 may provide data used for operating the vehicle 100. The two-way operability of the third pump 215 may prevent one of the reservoirs 110, 115 from running out of washer fluid when, e.g., the first pumps 205 are used more than the second pumps 210 or vice versa. The two-way operability may also permit the first reservoir 110 and the second reservoir 115 to collectively have a single filler neck 305. In other words, one of the first reservoir 110 and second reservoir 115 may lack a filler neck, permitting location on the vehicle 100 where a filler neck may be difficult to access.

With reference to FIG. 1, the vehicle 100 may be any passenger or commercial automobile such as a car, a truck, a sport utility vehicle, a crossover, a van, a minivan, a taxi, a bus, etc.

The vehicle 100 includes the environmental sensors 125. The environmental sensors 125 may detect the external environment, e.g., objects and/or characteristics of surroundings of the vehicle 100, such as other vehicles, road lane markings, traffic lights and/or signs, pedestrians, etc. For example, the environmental sensors 125 may include radar sensors, ultrasonic sensors, scanning laser range finders, light detection and ranging (lidar) devices, and image processing sensors such as cameras.

The cleaning assembly 105 includes the first reservoir 110 and the second reservoir 115. The first reservoir 110 and the second reservoir 115 may be spaced from each other in the vehicle 100. For example, the first reservoir 110 and the second reservoir 115 may be located at different positions in the front end of the vehicle 100, thereby keeping the connecting hose 120 short compared with locating one reservoir 110, 115 in the front end and the other reservoir 110, 115 in the rear end. The first reservoir 110 may be located where the filler neck 305 (shown in FIG. 3) is accessible by an operator of the vehicle 100, e.g., bordering an exterior body panel of the vehicle 100. The second reservoir 115 may be located more interiorly than the first reservoir 110, e.g., farther from a nearest exterior body panel than the first reservoir 110, e.g., with one or more components (such as the engine) of the vehicle 100 between the second reservoir 115 and the nearest exterior body panel, as the second reservoir 115 lacks a filler neck.

The first reservoir 110 and the second reservoir 115 may be tanks fillable with liquid. e.g., washer fluid for cleaning windows 130 or the environmental sensors 125. "Washer fluid" is any liquid stored in the reservoir for cleaning. The washer fluid may include solvents, detergents, diluents such as water, etc. The first reservoir 110 and the second reservoir 115 may each be enclosed.

The connecting hose 120 fluidly connects the first reservoir 110 and the second reservoir 115. The connecting hose 120 may be elongated from the first reservoir 110 through an interior of the vehicle 100 to the second reservoir 115. The connecting hose 120 may be, e.g., a flexible tube.

Figure 2:
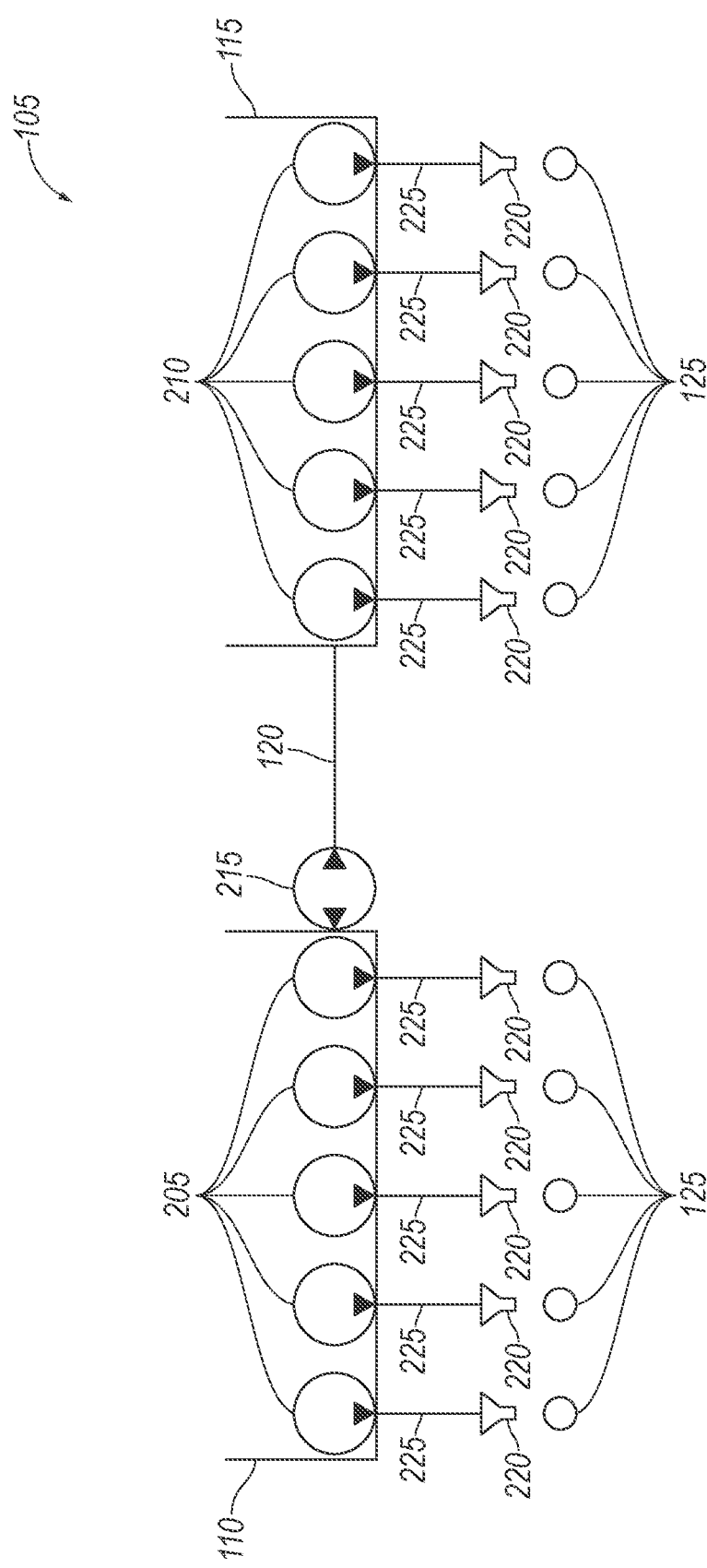
FIG. 2 is a flow diagram of a portion of the cleaning assembly.

With reference to FIG. 2, the cleaning assembly 105 includes the first reservoir 110, the second reservoir 115, the first pumps 205, the second pumps 210, the third pump 215, distribution hoses 225, and the nozzles 220. The pumps 205, 210 and the nozzles 220 are fluidly connected to each other (i.e., fluid can flow from one to the other) via the distribution hoses 225.

Figure 3:
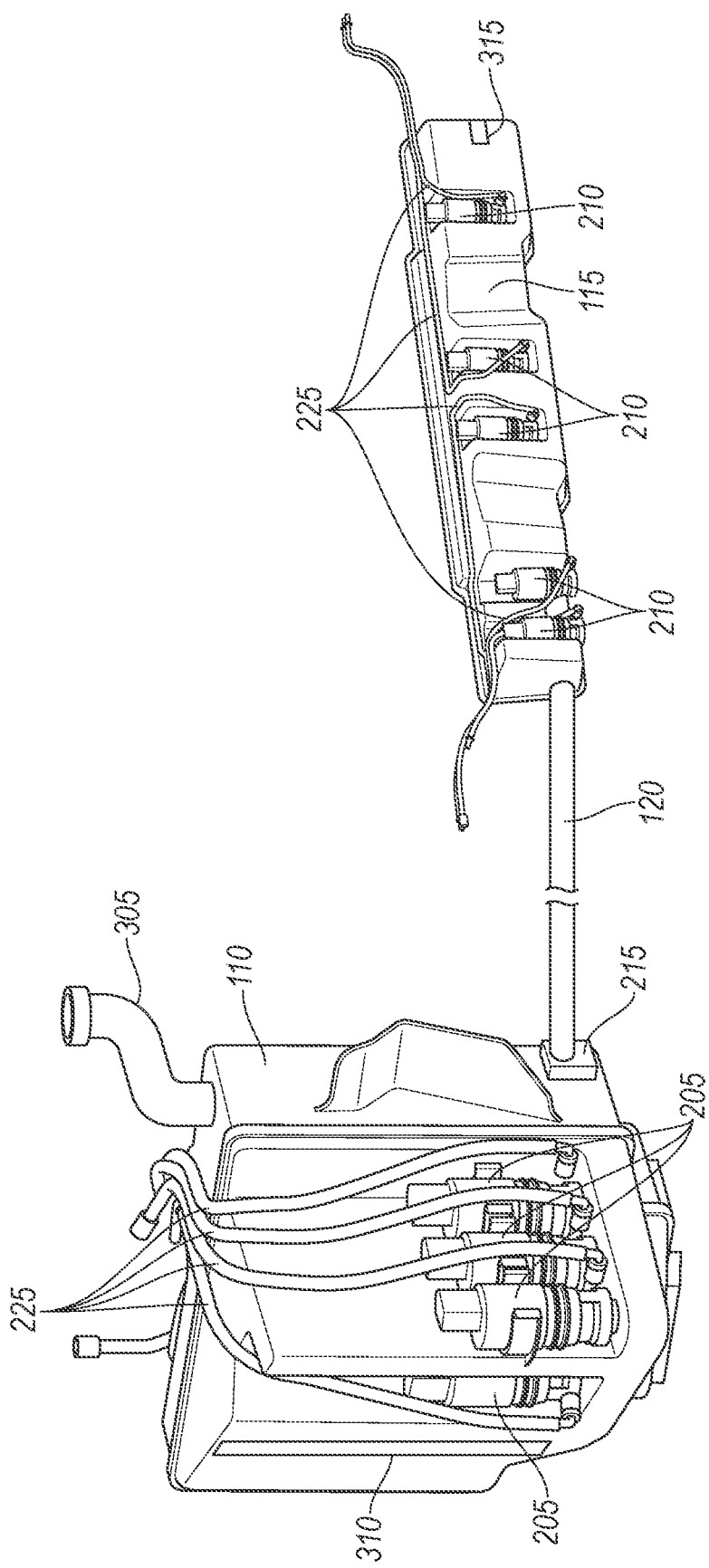
FIG. 3 is a diagrammatic perspective view of a portion of the cleaning assembly.

The first pumps 205 and second pumps 210 may force the washer fluid through the distribution hoses 225 to the nozzles 220 with sufficient pressure that the washer fluid sprays from the nozzles 220. The first pumps 205 are positioned to pump the washer fluid out of the first reservoir 110. The first pumps 205 may be attached to or disposed in the first reservoir 110, e.g., attached to draw the washer fluid from the first reservoir 110 at locations close to a bottom of the first reservoir 110, e.g., closer to a bottom of the first reservoir 110 than to a top of the first reservoir 110, as shown in FIG. 3. The second pumps 210 are positioned to pump the washer fluid out of the second reservoir 115. The second pumps 210 may be attached to or disposed in the second reservoir 115, e.g., attached to draw the washer fluid from the second reservoir 115 at locations close to a bottom of the second reservoir 115, e.g., closer to a bottom of the second reservoir 115 than to a top of the second reservoir 115, as shown in FIG. 3. A volume of the first reservoir 110 may be greater than a volume of the second reservoir 115, which may better facilitate the programming controlling the third pump 215 described below.

The distribution hoses 225 are elongated from the first pumps 205 or the second pumps 210 to the nozzles 220. For example, each distribution hose 225 may be elongated from one of the first pumps 205 or one of the second pumps 210 to a respective one of the nozzles 220. Other arrangements are possible, e.g., branching arrangements with one of the pumps 205, 210 supplying multiple nozzles 220. The distribution hoses 225 may be, e.g., flexible tubes.

Each nozzle 220 is fixedly positioned to receive fluid from a respective one of the first pumps 205 or second pumps 210, e.g., via the respective distribution hose 225. Each of the nozzles 220 may be aimed at a respective one of the environmental sensors 125, i.e., may be fixedly positioned to eject the washer fluid onto the respective one of the environmental sensors 125 so as to clean that environmental sensor 125.

With reference to FIG. 3, the third pump 215 is positioned to control fluid flow through the connecting hose 120. The third pump 215 may be positioned such that fluid flowing through the connecting hose 120 must flow through the third pump 215; i.e., there is no fluid route from the first reservoir 110 to the second reservoir 115 around the third pump 215, only through the third pump 215. For example, the third pump 215 may connect one end of the connecting hose 120 to the first reservoir 110, e.g., at a location close to a bottom of the first reservoir 110, e.g., closer to a bottom of the first reservoir 110 than to a top of the first reservoir 110. No hose other than the connecting hose 120 connects the first reservoir 110 and the second reservoir 115.

The third pump 215 is operable to pump fluid from the first reservoir 110 to the second reservoir 115, and the third pump 215 is operable to pump fluid from the second reservoir 115 to the first reservoir 110. In other words, the direction of flow through the third pump 215 is reversible. The third pump 215 may be switchable between a plurality of states. The states may include pumping from the first reservoir 110 to the second reservoir 115, pumping from the second reservoir 115 to the first reservoir 110, and inactive. The third pump 215 in the inactive state may block fluid from flowing either direction between the first reservoir 110 and the second reservoir 115. In other words, the third pump 215 in the inactive state may be, in effect, a two-way check valve.

The third pump 215 may have a lower head and/or a lower flow rate than the first pumps 205 and the second pumps 210. The third pump 215 may have a head greater than a difference in height between the first reservoir 110 and the second reservoir 115 in the vehicle 100. For example, the third pump 215 may be a micropump, i.e., a small pump.

The cleaning assembly 105 includes the filler neck 305, i.e., a tube extending downward from an upper end with an opening to a lower end positioned to empty into a reservoir.

The upper end may be shaped to accept a removable cap closing the filler neck 305 (not shown). An operator may remove the cap to add washer fluid to the cleaning assembly 105 by pouring the washer fluid into the filler neck 305. The lower end may be positioned to empty into the first reservoir 110. The first reservoir 110 may include the filler neck 305, and the second reservoir 115 may lack a filler neck. The cleaning assembly 105 may thus have a total of one filler neck 305, enhancing case of use by the operator.

The cleaning assembly 105 may include a variable fluid level sensor 310. The variable fluid level sensor 310 may be positioned to detect a fluid level of the first reservoir 110. The variable fluid level sensor 310 may return data indicating a height of fluid in the first reservoir 110. For example, the variable fluid level sensor 310 may be any suitable type for returning a scalar quantity indicating the fluid level, e.g., a hydrostatic sensor such as a displacer, bubbler, or differential pressure transmitter; a load cell; a capacitive transmitter; a magnetostrictive level transmitter; an ultrasonic level transmitter; a laser level transmitter; a radar level transmitter; etc.

The cleaning assembly 105 may include a fluid indicator sensor 315. The fluid indicator sensor 315 may be positioned to detect a presence of a fluid at a point in the second reservoir 115. For example, the fluid indicator sensor 315 may be located at a point to detect that the fluid level in the second reservoir 115 is low, e.g., a point closer to a bottom of the second reservoir 115 than to a top of the second reservoir 115. The fluid indicator sensor 315 may return data indicating either a presence or absence of fluid around the fluid indicator sensor 315. The second reservoir 115 may lack sensors indicating fluid level other than the fluid indicator sensor 315, as the fluid indicator sensor 315 provides sufficient data about the fluid level of the second reservoir 115 for the programming controlling the third pump 215 described below.

Figure 4:
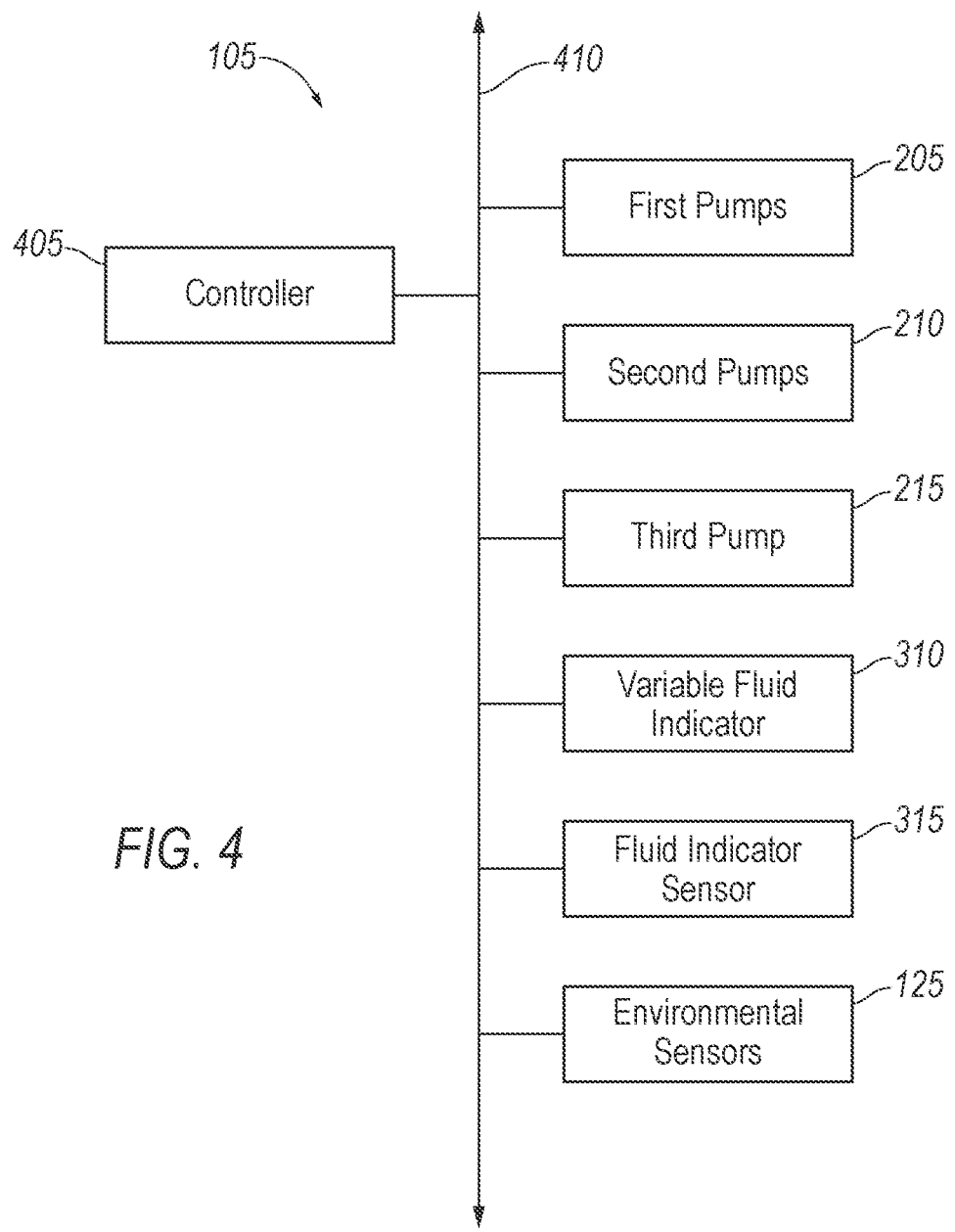
FIG. 4 is a block diagram of a portion of the cleaning assembly.

With reference to FIG. 4, the cleaning assembly 105 may include a controller 405. The controller 405 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 405 can thus include a processor, a memory, etc. The memory of the controller 405 can include media for storing instructions executable by the processor as well as for electronically storing data and/or databases, and/or the controller 405 can include structures such as the foregoing by which programming is provided. The controller 405 can be multiple computers coupled together.

The controller 405 may transmit and receive data through a communications network 410 such as a controller area network (CAN) bus, Ethernet, WiFi, Local Interconnect Network (LIN), onboard diagnostics connector (OBD-II), and/or by any other wired or wireless communications network. The controller 405 may be communicatively coupled to the first pumps 205, the second pumps 210, the third pump 215, the variable fluid level sensor 310, the fluid indicator sensor 315, the environmental sensors 125, and/or other components via the communications network 410.

The controller 405 may be programmed to actuate the first pumps 205 and/or the second pumps 210 to pump fluid from the first reservoir 110 and/or the second reservoir 115 to the nozzles 220 in response to data indicating that the environmental sensors 125 are at least partially obstructed. For example, the data may come from the environmental sensors 125. The controller 405 may selectively actuate one or a subset of the first pumps 205 and the second pumps 210 to pump fluid to the nozzles 220 aimed at the environmental sensors 125 returning data indicating that they are obstructed. For example, the controller 405 may determine, e.g., according to known image-analysis techniques, that a set of pixels in image data received from one of the environmental sensors 125 is unchanging over time compared to the other of the pixels in the image data, suggesting that a portion of the field of view of the environmental sensor 125 has been covered.

The controller 405 may be programmed to actuate the third pump 215 to pump fluid from the first reservoir 110 to the second reservoir 115, and the controller 405 may be programmed to actuate the third pump 215 to pump fluid from the second reservoir 115 to the first reservoir 110. The controller 405 may actuate the third pump 215 to pump fluid from the first reservoir 110 to the second reservoir 115 in response to one or more conditions being met, and the controller 405 may actuate the third pump 215 to stop pumping fluid from the first reservoir 110 to the second reservoir 115 in response to the conditions no longer being met or other conditions being met, as described below. Additionally, the controller 405 may actuate the third pump 215 to pump fluid from the second reservoir 115 to the first reservoir 110 in response to one or more conditions being met, and the controller 405 may actuate the third pump 215 to stop pumping fluid from the second reservoir 115 to the first reservoir 110 in response to those conditions no longer being met or other conditions being met, as described below.

The controller 405 may be programmed to actuate the third pump 215 to pump fluid from the first reservoir 110 to the second reservoir 115 in response to a condition being met. For example, the condition may be that data from the variable fluid level sensor 310 indicates that the fluid level of the first reservoir 110 is above a threshold, which will be referred to as the first high threshold. The first high threshold may be stored in the memory of the controller 405. The first high threshold may be chosen to indicate that the first reservoir 110 is nearly full or a majority full, e.g., the first high threshold may indicate that the first reservoir 110 is filled to a point above half the volume of the first reservoir 110. The fluid level of the first reservoir 110 may rise to the first high threshold when an operator is filling the first reservoir 110 with washer fluid, and actuating the third pump 215 to pump fluid from the first reservoir 110 to the second reservoir 115 permits both the first reservoir 110 and the second reservoir 115 to be filled at once from the single filler neck 305.

For another example, the condition to actuate the third pump 215 to pump fluid from the first reservoir 110 to the second reservoir 115 may be that data from the fluid indicator sensor 315 indicates that the fluid level of the second reservoir 115 is below a threshold, which will be referred to as the second threshold. The second threshold may correspond to the placement of the fluid indicator sensor 315 on the second reservoir 115. The second threshold, i.e., the position of the fluid indicator sensor 315, may be chosen to indicate that the fluid level of the second reservoir 115 is low, e.g., a point below half the volume of the second reservoir 115. The controller 405 may thus actuate the third pump 215 to prevent the second reservoir 115 from running out of washer fluid.

The controller 405 may be programmed to actuate the third pump 215 to stop pumping fluid from the first reservoir 110 to the second reservoir 115 in response to a condition being met. For example, if the controller 405 actuated the third pump 215 to pump fluid to the second reservoir 115 in response to the fluid level of the first reservoir 110 exceeding the first high threshold, the controller 405 may actuate the third pump 215 to stop pumping fluid to the second reservoir 115 after a variable time since starting pumping fluid to the second reservoir 115. The controller 405 may determine the variable time based on tracked actuations of the second pumps 210 since previously pumping fluid to the second reservoir 115, e.g., so that the variable time is the amount of time to pump a volume of fluid equal to the volume pumped out of the second reservoir 115 by the second pumps 210. For another example, if the controller 405 actuated the third pump 215 to pump to the second reservoir 115 in response to the fluid level of the second reservoir 115 falling below the second threshold, the controller 405 may actuate the third pump 215 to stop pumping fluid to the second reservoir 115 after a preset time since starting pumping fluid to the second reservoir 115. The preset time may be stored in the memory of the controller 405. The preset time may be chosen to be a time to fill the second reservoir 115 when the fluid level is at the second threshold.

The controller 405 may be programmed to actuate the third pump 215 to pump fluid from the second reservoir 115 to the first reservoir 110 in response to a condition being met. For example, the condition may be that data from the variable fluid level sensor 310 indicates that the fluid level of the first reservoir 110 is below a threshold, which will be referred to as the first low threshold. The first low threshold may be stored in the memory of the controller 405. The first low threshold may be chosen to indicate that the fluid level of the first reservoir 110 is low, e.g., a point below half the volume of the first reservoir 110. The first low threshold is below the first high threshold.

The controller 405 may be programmed to actuate the third pump 215 to stop pumping fluid from the second reservoir 115 to the first reservoir 110 in response to a condition being met. For example, the condition may be that data from the variable fluid level sensor 310 indicates that the fluid level of the first reservoir 110 is above a threshold, which will be referred to as a filling threshold. The filling threshold may be stored in the memory of the computer. The filling threshold may be chosen based on a volume of the second reservoir 115, e.g., to be a fraction of the volume of the second reservoir 115. The filling threshold is higher than the first low threshold and may be higher, lower, or equal to the first high threshold. For another example, the condition may be that the third pump 215 begins pulling air from the second reservoir 115 instead of fluid. The connecting hose 120 may be connected to the second reservoir 115 at a point above the bottom of the second reservoir 115. Thus, even after this condition is met, a volume of fluid will remain in the second reservoir 115 based on a distance from the connection between the connecting hose 120 and the second reservoir 115 to the bottom of the second reservoir 115. For another example, the condition may be that data from the fluid indicator sensor 315 indicates that the fluid level of the second reservoir 115 is below the second threshold.

Figure 5:
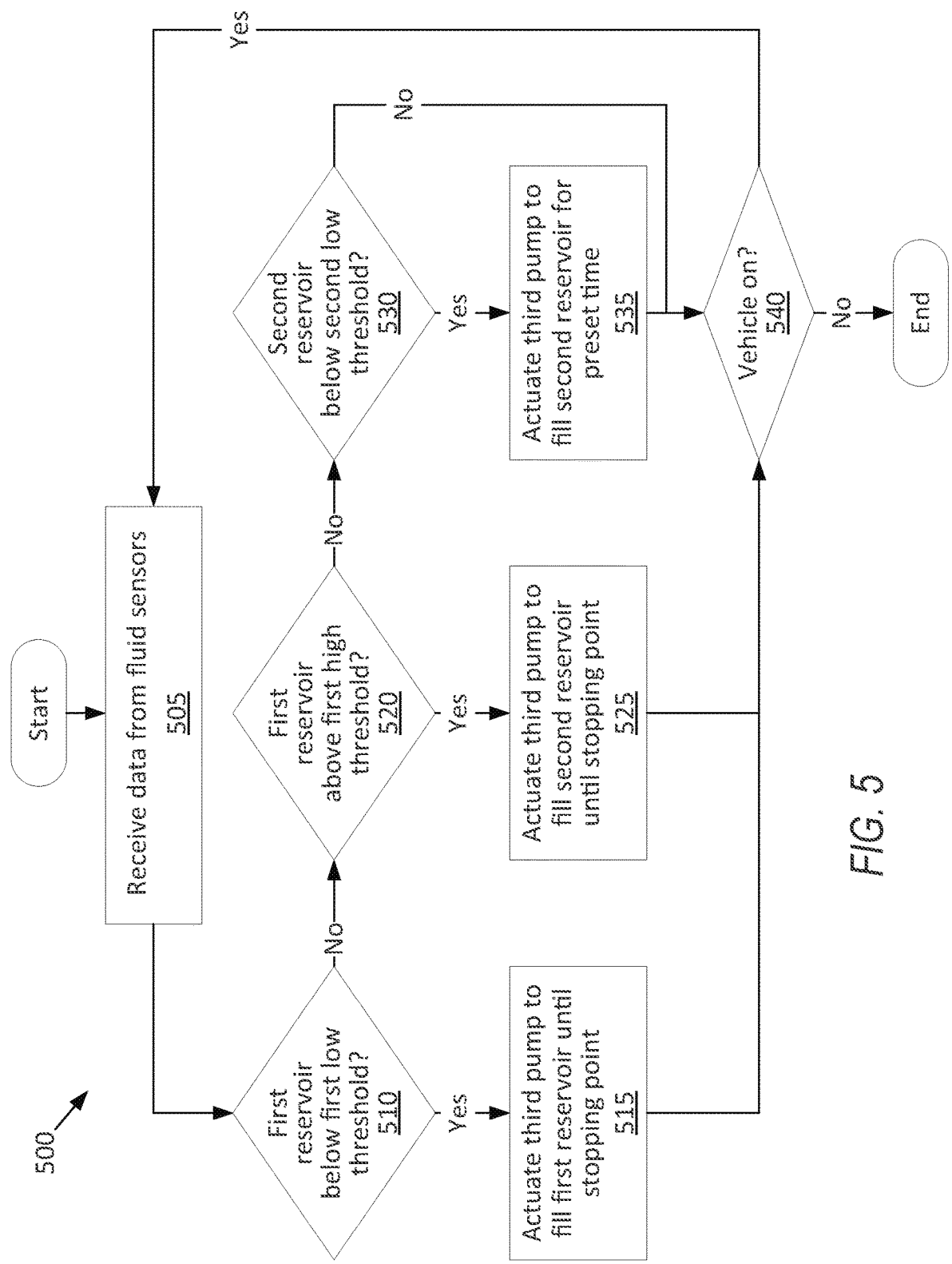
FIG. 5 is a flowchart of an example process for operating the cleaning assembly.

FIG. 5 is a process flow diagram illustrating an example process 500 for actuating the third pump 215. The memory of the controller 405 stores executable instructions for performing the steps of the process 500 and/or programming can be implemented in structures such as mentioned above. As a general overview of the process 500, the controller 405 receives data from the variable fluid level sensor 310 and the fluid indicator sensor 315. In response to the fluid level of the first reservoir 110 being below the first low threshold, the controller 405 actuates the third pump 215 to pump fluid from the second reservoir 115 to the first reservoir 110. The condition for pumping fluid from the second reservoir 115 to the first reservoir 110 may take precedence over the conditions for pumping fluid from the first reservoir 110 to the second reservoir 115. In response to the fluid level of the first reservoir 110 being above the first high threshold, the controller 405 actuates the third pump 215 to pump fluid from the first reservoir 110 to the second reservoir 115. In response to the fluid level of the second reservoir 115 being below the second threshold, the controller 405 actuates the third pump 215 to pump fluid from the first reservoir 110 to the second reservoir 115. The process 500 continues for as long as the vehicle 100 is on.

The process 500 begins in a block 505, in which the controller 405 receives data from the variable fluid level sensor 310 and the fluid indicator sensor 315, i.e., the fluid level of the first reservoir 110 and the fluid level of the second reservoir 115. The fluid level of the second reservoir 115 may be a binary variable indicating whether the fluid level is above or below the second threshold.

Next, in a decision block 510, the controller 405 determines whether the fluid level of the first reservoir 110 is below the first low threshold, as described above. In response to the fluid level of the first reservoir 110 being below the first low threshold, the process 500 proceeds to a block 515. In response to the fluid level of the first reservoir 110 being above the first low threshold, the process 500 proceeds to a decision block 520.

In the block 515, the controller 405 actuates the third pump 215 to pump fluid from the second reservoir 115 to the first reservoir 110 until the condition for stopping is met, as described above. After the block 515, the process 500 proceeds to a decision block 540.

In the decision block 520, the controller 405 determines whether the fluid level of the first reservoir 110 is above the first high threshold, as described above. In response to the fluid level of the first reservoir 110 being above the first high threshold, the process 500 proceeds to a block 525. In response to the fluid level of the first reservoir 110 being below the first high threshold, the process 500 proceeds to a decision block 530.

In the block 525, the controller 405 actuates the third pump 215 to pump fluid from the first reservoir 110 to the second reservoir 115 until the condition for stopping is met, as described above. After the block 525, the process 500 proceeds to the decision block 540.

In the decision block 530, the controller 405 determines whether the fluid level of the second reservoir 115 is below the second threshold, as described above. In response to the fluid level of the second reservoir 115 being below the second threshold, the process 500 proceeds to a block 535. In response to the fluid level of the second reservoir 115 being above the second threshold, the process 500 proceeds to the decision block 540.

In the block 535, the controller 405 actuates the third pump 215 to pump fluid from the first reservoir 110 to the second reservoir 115, e.g., for the preset time, as described above. After the block 535, the process 500 proceeds to the decision block 540.

In the decision block 540, the controller 405 determines whether the vehicle 100 is still on. If so, the process 500 returns to the block 505 to continue receiving data indicating the fluid levels of the first reservoir 110 and the second reservoir 115. If not, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A cleaning assembly comprising:
a first reservoir;
a second reservoir;
a first pump positioned to pump fluid out of the first reservoir;
a second pump positioned to pump fluid out of the second reservoir;
a connecting hose fluidly connecting the first reservoir and the second reservoir; and
a third pump positioned to control fluid flow through the connecting hose;
wherein the third pump is operable to pump fluid from the first reservoir to the second reservoir, and the third pump is operable to pump fluid from the second reservoir to the first reservoir.

2. The cleaning assembly of claim 1, wherein the first reservoir includes a filler neck.

3. The cleaning assembly of claim 2, wherein the second reservoir lacks a filler neck.

4. The cleaning assembly of claim 3, wherein a volume of the first reservoir is greater than a volume of the second reservoir.

5. The cleaning assembly of claim 3, further comprising a variable fluid level sensor positioned to detect a fluid level of the first reservoir.

6. The cleaning assembly of claim 5, further comprising a fluid indicator sensor positioned to detect a presence of a fluid at a point in the second reservoir.

7. The cleaning assembly of claim 6, wherein the second reservoir lacks sensors indicating fluid level other than the fluid indicator sensor.

8. The cleaning assembly of claim 1, wherein the second reservoir lacks a filler neck.

9. The cleaning assembly of claim 1, further comprising a controller communicatively coupled to the third pump, wherein the controller is programmed to actuate the third pump to pump fluid from the first reservoir to the second reservoir, and the controller is programmed to actuate the third pump to pump fluid from the second reservoir to the first reservoir.

10. The cleaning assembly of claim 9, wherein the controller is programmed to receive a fluid level of the first reservoir, and actuate the third pump to pump fluid from the second reservoir to the first reservoir in response to the fluid level being below a threshold.

11. The cleaning assembly of claim 10, wherein the threshold is a low threshold, and the controller is programmed to actuate the third pump to pump fluid from the first reservoir to the second reservoir in response to the fluid level being above a high threshold.

12. The cleaning assembly of claim 10, wherein the threshold is a first threshold, the fluid level is a first fluid level, and the controller is programmed to receive a second fluid level of the second reservoir, and actuate the third pump to pump fluid from the first reservoir to the second reservoir in response to the second fluid level being below a second threshold.

13. The cleaning assembly of claim 12, wherein the controller is programmed to actuate the third pump to pump fluid from the first reservoir to the second reservoir for a preset time in response to the second fluid level being below the second threshold.

14. The cleaning assembly of claim 12, wherein the first reservoir includes a filler neck, and the second reservoir lacks a filler neck.

15. The cleaning assembly of claim 9, wherein the controller is programmed to receive a fluid level of the first reservoir, and actuate the third pump to pump fluid from the first reservoir to the second reservoir in response to the fluid level being above a threshold.

16. The cleaning assembly of claim 1, further comprising a nozzle positioned to receive fluid from the first pump, wherein the nozzle is aimed at a sensor.

17. The cleaning assembly of claim 16, wherein the nozzle is a first nozzle, and the sensor is a first sensor, the cleaning assembly further comprising a second nozzle positioned to receive fluid from the second pump, wherein the second nozzle is aimed at a second sensor.

18. The cleaning assembly of claim 16, further comprising a plurality of first pumps including the first pump, and a plurality of nozzles including the nozzle, wherein the first pumps are positioned to pump fluid out of the first reservoir, each nozzle is positioned to receive fluid from a respective one of the first pumps, and each nozzle is aimed at a respective one of a plurality of sensors including the sensor.

19. The cleaning assembly of claim 18, wherein the nozzles are first nozzles, and the sensors are first sensors, the cleaning assembly further comprising a plurality of second pumps and a plurality of second nozzles, wherein the second pumps are positioned to pump fluid out of the second reservoir, each second nozzle is positioned to receive fluid from a respective one of the second pumps, and each second nozzle is aimed at a respective one of a plurality of second sensors.

20. The cleaning assembly of claim 1, wherein the third pump has a lower head than the first pump.

\* \* \* \* \*